United States Patent
Gitlin et al.

(10) Patent No.: US 6,438,379 B1
(45) Date of Patent: Aug. 20, 2002

(54) POWER CONTROL AND CELL SITE LOCATION TECHNIQUE FOR CDMA SYSTEMS WITH HIERARCHICAL ARCHITECTURE

(75) Inventors: Richard Dennis Gitlin, Little Silver, NJ (US); Howard C. Huang, New York, NY (US); Rajeev Krishnamoorthy, Middletown; Reinaldo A. Valenzuela, Holmdel, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/322,941

(22) Filed: May 28, 1999

(51) Int. Cl.$^7$ ................................................ H04Q 7/36
(52) U.S. Cl. ...................................... 455/449; 455/522
(58) Field of Search ........................... 370/342; 455/446, 455/447, 448, 449, 522

(56) References Cited

U.S. PATENT DOCUMENTS 5,822,698 A * 10/1998 Tang et al. .................. 455/447
5,924,036 A * 7/1999 Gustafson .................... 455/447

* cited by examiner

Primary Examiner—Thanh Cong Le
Assistant Examiner—Nick Corsaro
(74) Attorney, Agent, or Firm—Barry H. Freedman

(57) ABSTRACT

Multiple microcell base stations are located within a macrocell having single macrocell base station in an hierarchical architecture, and microcell users ($\mu$-users) and macrocell users (M-users) communicate respectively with the $\mu$-base and the M-base using the same frequency band, by appropriately (a) selecting the ratio of the radius r of each $\mu$ cell and the average distance d from the M-base (r and d are measured by the "radio distance", which includes the effects of shadowing), and (b) controlling the power level with which uplink (mobile to base) and downlink (base to mobile) messages are communicated. Typically, $\mu$-cell size and location are chosen such that d/r>10. With respect to uplink communications, the transmit powers of the $\mu$-users in a $\mu$-cell are controlled so that the total received power at the nearest M-base is equivalent to the received power from C M-users, where C is usually set to unity. As a result, the M-cell basically loses C users worth of capacity, but the total number of users is increased by virtue of the additional $\mu$-users. With respect to downlink communications, as long as the microbase and the macrobase are coordinated systems, the $\mu$-base transmit power is controlled so that at the point of handoff between a $\mu$-base and M-base, the received power at a user from the two bases is equivalent, and the received power at the bases from this user is also equivalent. With this arrangement, the $\mu$-base transmit power is increased as r grows and d decreases in order for this balance to occur. Where the M-base and $\mu$-base have no knowledge of each other and handoffs are not allowed between the two base types, a family of I/Q short codes which are quasi-orthogonal to the existing short (pilot) codes are generated, and these codes are used to distinguish between the M-base and $\mu$-base signals.

13 Claims, 2 Drawing Sheets

---

SELECT $\mu$-BASE AND M-BASE LOCATIONS SO THAT THE RATIO BETWEEN THE $\mu$-BASE-TO-M-BASE DISTANCE AND THE $\mu$-CELL RADIUS IS AT LEAST 5. — 301

CONTROL THE TRANSMIT POWER OF THE $\mu$-USERS SO THAT THE TOTAL RADIATED POWER FROM THE $\mu$-CELL REACHING THE NEAREST M-BASE IS EQUIVALENT TO THE AVERAGE RECEIVED POWER OF C M-USERS — 303

CONTROL THE $\mu$-BASE PILOT POWER ON THE DOWNLINK SO THAT THE HANDOFF POINT FOR THE UPLINK AND DOWNLINK ARE EQUIVALENT — 305

- M-base
○ μ-cell

FIG. 3

| |
|---|
| SELECT μ-BASE AND M-BASE LOCATIONS SO THAT THE RATIO BETWEEN THE μ-BASE-TO-M-BASE DISTANCE AND THE μ-CELL RADIUS IS AT LEAST 5. | 301

| |
|---|
| CONTROL THE TRANSMIT POWER OF THE μ-USERS SO THAT THE TOTAL RADIATED POWER FROM THE μ-CELL REACHING THE NEAREST M-BASE IS EQUIVALENT TO THE AVERAGE RECEIVED POWER OF C M-USERS | 303

| |
|---|
| CONTROL THE μ-BASE PILOT POWER ON THE DOWNLINK SO THAT THE HANDOFF POINT FOR THE UPLINK AND DOWNLINK ARE EQUIVALENT | 305

POWER CONTROL AND CELL SITE LOCATION TECHNIQUE FOR CDMA SYSTEMS WITH HIERARCHICAL ARCHITECTURE

FIELD OF THE INVENTION

The present invention relates generally to CDMA cellular telecommunications systems in which multiple microcells ($\mu$-cells) can be located within an existing macrocell (M-cell), and operate in the same frequency band, and, more particularly, to such systems in which the microcell size and location is selected, and the uplink and downlink transmission power is controlled, so that the respective microcell and macrocell users can communicate without noticeable interference between each other.

BACKGROUND OF THE INVENTION

Cellular digital communications systems using CDMA in accordance with the IS-95 standard are currently being deployed for use in the 900 MHz cellular band and 2 GHz PCS band. As the popularity of this type of cellular communication increases, and the number of users and the traffic load increases, there is a need to expand the ability of an existing CDMA cell to carry even more traffic. One proposed solution is to overlay a CDMA M-cell with a TDMA $\mu$-cell and vice versa, as described by C.-L. I, L. J. Greenstein, and R. D. Gitlin in "A microcell/macrocell cellular architecture for low- and high-mobility wireless users," IEEE Selected Areas in Communications, vol. 11, no. 6, pp. 885–891, August 1993. However, there has not been a technique that allows a plurality IS-95 microcells to be embedded within an existing IS-95 macrocell which uses the same CDMA band. Such a hierarchical architecture would be useful in a number of applications, such as installing local wireless PBXs and handling localized areas of high usage within a macrocell.

SUMMARY OF THE INVENTION

In accordance with the present invention, multiple microcell base stations are located within a macrocell having a single macrocell base station in an hierarchical architecture, and microcell users ($\mu$-users) and macrocell users (M-users) communicate respectively with the abase and the M-base in the same frequency band, by appropriately (a) selecting the ratio of the radius r of each $\mu$-cell and the distance d between the M-base and the $\mu$-base (r and d are measured by the "radio distance", which includes the distance dependent path loss and effects of shadowing), and (b) controlling the power level with which uplink (mobile to base) and downlink (base to mobile) messages are communicated so that the combined capacity of the M-cell and $\mu$-cell(s) are high.

In accordance with one aspect of the present invention, $\mu$-cell size and location are chosen such that the distance d between M-base and the $\mu$-base is a multiple of the radius r of the $\mu$-cell. As a minimum, the system is arranged so that d/r>5; ideally, the locations of the M-base and the $\mu$-base are chosen so that d/r>10. For a typical application, the microcell is intended to located within a building, so that r is typically between 50 and 100 meters. By way of comparison, a macrocell typically has a radius of between 100 and 3000 meters.

In accordance with another aspect of the invention, with respect to uplink communications, the transmit powers of the $\mu$-users in a $\mu$-cell are controlled so that the total received power at the nearest M-base is some fixed power level equivalent to the received power from C M-users. Hence, the M-cell basically loses C users worth of capacity, but the total system capacity is increased by virtue of the additional $\mu$-users.

In accordance with yet another aspect of the invention, if the microbase and the macrobase are coordinated systems such that they can communicate with each other via a mobile telephone switching office (MTSO) with appropriate signaling messages, a M-user would be handed off to the $\mu$-base if the M-user begins to cause excessive interference to the $\mu$-base. This arrangement avoids the pathological case of a single mobile terminal causing enough interference to bring down an entire system.

In accordance with yet another aspect of the invention, where the M-base and $\mu$-base have no knowledge of each other and handoffs are not allowed between the two base types, a family of I/Q short codes which are quasi-orthogonal to the existing M-base short (pilot) codes are generated for the $\mu$-base, and these codes are used to distinguish the $\mu$-base from the M-base.

Analysis has shown that with the arrangement of the present invention, an easy to implement and scalable system for embedding multiple CDMA microcells within a macrocell can operate such that macrocell and microcell users communicate within the same frequency band and yet interference is at an acceptable level. Accounting for shadow fading, and for a 1% outage probability, the total capacity of a macrocell with five embedded microcells arranged in accordance with the present invention is more than double the capacity of the macrocell alone.

BRIEF DESCRIPTION OF THE DRAWING

The present invention will be more fully appreciated by consideration of the following detailed description, which should be read in light of the accompanying drawing in which:

FIG. 3 summarizes the process of the present invention for placing the $\mu$-cell within the M-cell and for adjusting the power levels.

DETAILED DESCRIPTION OF THE INVENTION

Before proceeding with a detailed description, several assumptions about the system are discussed:

First, it is assumed that the M and $\mu$-cells share the same uplink and downlink channels.

Second, in the actual system implementation, if there is coordination between the M and $\mu$-bases, soft handoffs can occur between the two. However, to simplify the analysis, we assume that only hard handoffs are allowed; in other words, each user communicates with only one base station at any given time.

Third, it is assumed that uplink power control is perfect, so that the received mobile powers at their corresponding base station are all equal.

Fourth, we focus on the average received power; hence in our analysis, we account for shadow fading but not for fast Rayleigh fading. Because the shadow fading is caused by large scale objects and is frequency nonselective with respect to the CDMA band, it will be the same for the uplink and downlink.

Figure 1:
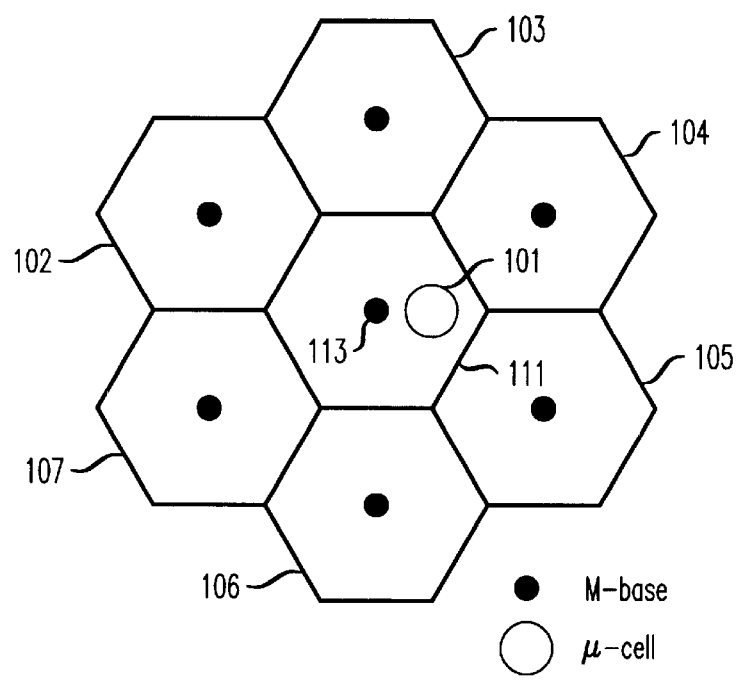
FIG. 1 is a diagram illustrating the geographic layout of our system.

Referring first to FIG. 1, the geographic layout of our system is shown. A group of six hexagonal M-cells 102–107 surround a central M-cell 111. Each M-cell has an associated M-base located in the center of the cell. For example, base station 113 is at the center of M-cell 111, and for purposes of analysis is considered to be located at the origin of the coordinate axes. A $\mu$-cell 101 lies in M-cell 111.

Figure 2:
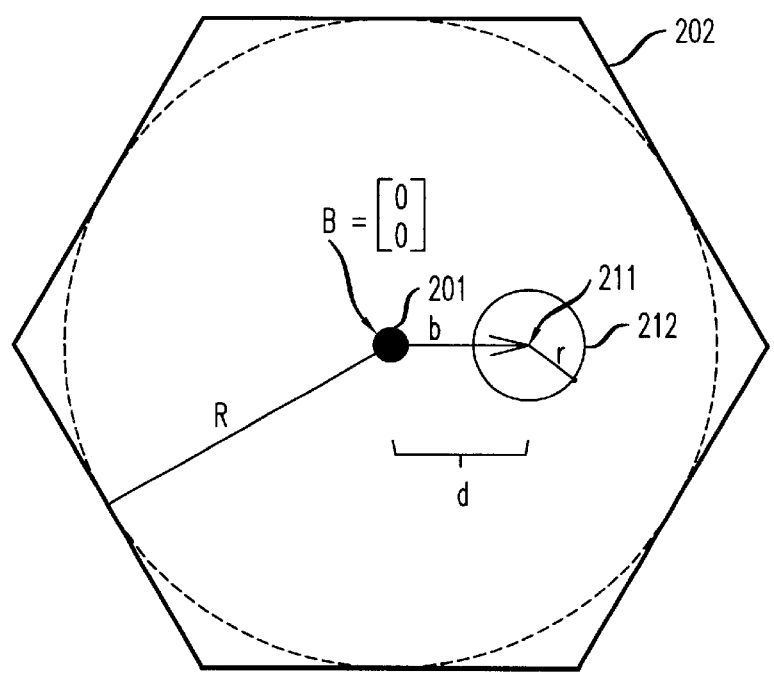
FIG. 2 shows the relationship between the M-cell and $\mu$-cell with regard to the M-cell radius (R), the $\mu$-cell radius (r), and the distance between the M-base and $\mu$-base (d)

FIG. 2 shows M-cell 111 in more detail. The respective radii of the M-cell 202 and $\mu$-cell 212 are R and r. We use d to denote the distance between a M-base 201 and $\mu$-base 211. The $\mu$-base is assumed to lie in the center of the $\mu$-cell.

Because the IS-95 standard relates to an interference limited system, an important aspect of the present invention is to apply constraints on transmit powers such that there is an acceptable signal-noise-ratio (SNR) at the desired receiver and such that the interference is tolerable at all other receivers. This principle applies to both the uplink (transmissions from mobile users to base stations) and the downlink (transmissions from the base stations to the mobile users).

First we consider the uplink transmission. Since the microcells will be much smaller than a macrocell, the $\mu$-users can, in general, maintain a desired signal-to-thermal noise ratio (SNR) at the $\mu$-base by transmitting with much less power than a M-user. Lower transmit power by the $\mu$-users is desirable, since it results in less interference at the M-base. However, the $\mu$-user transmit powers cannot be arbitrarily small, since the received signals at the $\mu$-base must meet SNR and signal-to-interference/noise ratio (SINR) requirements. The interference here includes signals from other $\mu$-users in the $\mu$-cell, from $\mu$-users in other $\mu$-cells, and from M-users. Our goal is to provide a micro/macrocell system with sufficient capacity in which the SINR requirements for the both base stations are met.

The present invention sets the transmit powers of the $\mu$-users in a $\mu$-cell so that the total received power at the nearest M-base is equivalent to some fixed power level equivalent to the average received power from C M-users. Hence the M-cell basically loses C users worth of capacity, but the overall system capacity increases since the number of $\mu$-users introduced is more than C. Under this criterion for the M-base interference, we arrange the size (in terms of radius r) and position (in terms of distance d) of the $\mu$-cell so that it can support a reasonable number of users. For a fixed number of $\mu$-users and for a fixed value of C, a larger r and smaller d leads to a smaller average received power at the $\mu$-base for each $\mu$-user. A smaller average received power results in less tolerance to interference at the $\mu$-base due to M-users. Hence d and r are chosen so that the $\mu$-base is robust against the M-users and can support a reasonable number of $\mu$-users.

Following a numerical analysis, a rule of thumb applicable to the present invention is that if C=1 and d/r>10, then the $\mu$-cell can support about 30 $\mu$-users. For example, for a typical $\mu$-cell of radius r=50 m to support 30 users, the $\mu$-cell must be at least 500 m away from the M-base. If the number of users or the cell size is smaller, the $\mu$-cell can be placed closer to the M-base. While the d/r ratio can be smaller than 10, with a minimum of d/r>5, the resulting $\mu$-cell capacity might then be less than 30 users. The analysis was extended to include the interference caused by users in nearby $\mu$-cells, and it was shown that this type of interference is minimal. Hence a M-cell can support multiple $\mu$-cells with 30 users each as long as each of the $\mu$-cells individually satisfies the d/r criterion.

We now consider the downlink of a coordinated system in which the M-base and the $\mu$-base communicate via a mobile telephone switching office (MTSO) and in which handoffs can occur between the M-base and $\mu$-base. The mobile users can identify the base station signals by demodulating their respective pilot signals. In coordinated systems, the pilot signals for both the M-bases and $\mu$-bases are taken from a set of signals designated by the CDMA standard. In accordance with our invention, the $\mu$-base transmit power is set so that at the point of handoff between a $\mu$-base and M-base, the received power at a user from the two bases is equivalent, and the received power at the bases from this user is also equivalent. The $\mu$-base transmit power must increase as r grows and d decreases in order for this balance to occur. Once this power is set for a given r and d, numerical analysis has shown that the resulting signal-to-interference/noise (SINR) ratio at the $\mu$-users and M-users is sufficiently high.

For the downlink of an uncoordinated system, the $\mu$-cells operate independently of the M-cells. Hence the pilot signals from the $\mu$-base cannot be taken from the set of signals designated by the CDMA standard; otherwise, mobiles could handoff between the M-base and $\mu$-base. We assume the standard defines a set of in-phase (I) and quadrature (Q) pilot signals obtained by time shifting a short code sequence (see for example the IS-95 CDMA standard). Denote these short code sequences for the M-base as $I_M$ and $Q_M$. We shall also denote by $I_M^k$ and $Q_M^k$ the k-chip shifted versions of the basic short code sequences. A mobile first acquires the pilot sequence by searching over all possible chip offsets and choosing offset corresponding to the strongest sequence; it then demodulates the sync channel which contains administrative information including the pilot offset k.

In order for the downlink communications to operate properly, it is necessary to develop a forward channel for $\mu$-base stations which is readily distinguishable from the M-base forward channel. The sequences $I_{\mu k}$ and $Q_\mu^k$ must exhibit good auto correlation properties and be quasi-orthogonal to (i.e., have very low cross correlation with respect to) both $I_M^k$ and $Q_M^k$. The resulting $\mu$-base pilot sequences must be well suited for systems in which the $\mu$-cell and M-cell are independent and are not controlled by the same mobile telephone switching office (MTSO); in such systems, handoffs are not allowed between the $\mu$-cell and M-cell, and each mobile must be able to distinguish between $\mu$-base pilots and M-base pilots on its own.

In accordance with our invention, the technique for generating the $\mu$-base pilot sequences is based on pseudo-Gold sequences. It is known from the theory of Gold codes that a family of code sequences with excellent cross correlation properties can be generated from two equal length m-sequences by taking the modulo-2 sum of one sequence with shifted versions of the other sequence. In general, given the sequences $I_M$ and $Q_M$, we define the short code sequences for the $\mu$-base pilots as $I_\mu = I_M \oplus Q_M$ and $Q_\mu = I_M \oplus Q_M^n$ where $\oplus$ denotes modulo-2 addition, and $X^n$ denotes the n-cyclic shift of vector X. The pilot signals are the cyclically shifted versions of these short codes: $I_\mu^k$ and $Q_\mu^k$. The value n is chosen so the resulting pilot signals have low cross correlations with respect to each other and with respect to the M-base pilot signals.

In particular, if $I_M$ and $Q_M$ are pseudo m-sequences obtained by taking an m-sequence of length $2^{15}-1$ and appending a zero after the sequence of 14 consecutive zeros (as in the IS-95 standard), setting n=3 leads to low cross correlations. Like the M-base pilot sequences, different k-chip shifted versions of the basic $\mu$-pilot sequences $I_\mu^k$ and $Q_\mu^k$ (k is a multiple of 64) can be assigned to the different $\mu$-base stations.

The process by which the present invention can be implemented is summarized in FIG. 3. In order to overlay multiple μ-cells in existing IS-95 M-cells, the μ-base and M-base locations are first selected in step 301 so that the ratio between the μ-base-to-M-base distance and the μ-cell radius is at least 5. (As indicated above, best results are obtained if the system is arranged such that d/r>10.) Next, the transmit power of the μ-users is set, in step 303, so that the total radiated power from the μ-cell reaching the nearest M-base is equivalent to the average received power of C M-users (where C is a parameter chosen by the system designer). In step 305, the μ-base pilot power on the downlink is set so that the handoff point for the uplink and downlink are equivalent.

Various modifications and adaptations of the present invention will be appreciated by persons skilled in the art. For that reason, the invention is to be limited only by the appended claims. As an example, the interference levels likely to exist at the base stations can be further reduced using various well known interference cancellation and/or antenna array processing techniques.

What is claimed is:

1. A technique for locating multiple microcell base stations within a macro-cell having a single macrocell base station so that microcell users (μ-users) and macro-cell users (M-users) communicate respectively with the μ-base stations and the M-base station using the same frequency band, comprising the steps of selecting the ratio of the radius r of each μ-cell and the average distance d from the M-base such that d/r>5 and controlling the power level with which uplink (mobile to base) and downlink (base to mobile) messages are communicated between micro cell users and the micro cell base so that the total received power at the nearest M-base is equivalent to the received power from C M-users.

2. The invention defined in claim 1 wherein C is set to unity.

3. The invention defined in claim 1 wherein r and d are measured by the "radio distance", which includes the effects of shadowing.

4. The invention defined in claim 1 wherein the microbase and the macrobase are coordinated systems with respect to downlink communications, and wherein the μ-base transmit power is controlled so that at the point of handoff between a μ-base and M-base, the received power at a user from the two bases is equivalent, and the received power at the bases from this user is also equivalent.

5. The invention defined in claim 1 wherein the M-base and μ-base have no knowledge of each other and handoffs are not allowed between the two base types, and wherein a family of I/Q short codes which are quasi-orthogonal to the existing short (pilot) codes are generated, and these codes are used to distinguish between the M-base and μ-base signals.

6. The invention defined in claim 5 wherein said I/Q short codes are given by the sequences $I_M$ and $Q_M$, and wherein the short code sequences for the μ-base pilots are $I_\mu = I_M \oplus Q_M$ and $Q_\mu = I_M \oplus Q_M^n$ where $\oplus$ denotes modulo-2 addition, and $X^n$ denotes the n-cyclic shift of vector X.

7. The invention defined in claim 6 wherein said microcell base stations generate pilot signals that are the cyclically shifted versions of these short codes: $I_\mu^k$ and $Q_\mu^k$.

8. The invention defined in claim 6 wherein the value n is chosen so the resulting pilot signals have low cross correlations with respect to each other and with respect to the M-base pilot signals.

9. The invention defined in claim 1 wherein the microcell base stations generate μ-base pilot sequences based on pseudo-Gold sequences.

10. The invention defined in claim 9 wherein said pseudo-Gold sequences comprise a family of code sequences generated from two equal length m-sequences by taking the modulo-2 sum of one sequence with shifted versions of the other sequence.

11. A method for allowing a plurality of macrocell users (M-users) in a macrocell to communicate with a M-base station, and for simultaneously allowing microcell users (μ-users) in a plurality of microcells of radius r to communicate with respective μ-base stations located within said macrocell, the communications of said M-users and said μ-users using the same frequency band, said method comprising the steps of selecting the ratio of the radius r of each μ-cell and the average distance d from the M-base such that d/r>5 and controlling the power level with which uplink (mobile to base) and downlink (base to mobile) messages are communicated between micro cell users and the micro cell base so that the total received power at the nearest M-base is equivalent to the received power from one M-user.

12. The invention defined in claim 11 wherein C is set to unity.

13. The invention defined in claim 1 wherein d/r>10.

* * * * *